(12) United States Patent
Ek et al.

(10) Patent No.: US 8,390,238 B2
(45) Date of Patent: Mar. 5, 2013

(54) SOFTSTARTER FOR CONTROLLING AN ASYNCHRONOUS THREE-PHASE MOTOR

(75) Inventors: Magnus Ek, Västerås (SE); Heinz Lendenmann, Västerås (SE); Jesper Kristensson, Stockholm (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 13/483,443

(22) Filed: May 30, 2012

(65) Prior Publication Data

US 2012/0262103 A1 Oct. 18, 2012

Related U.S. Application Data

(63) Continuation of application No. PCT/EP2009/066026, filed on Nov. 30, 2009.

(51) Int. Cl.
*H02P 1/28* (2006.01)

(52) U.S. Cl. ........ 318/778; 318/729; 318/739; 318/798; 318/799; 318/800

(58) Field of Classification Search .................. 318/778, 318/729, 739, 798–803
See application file for complete search history.

(56) References Cited

U.S. PATENT DOCUMENTS

| | | | |
|---|---|---|---|
| 5,008,608 A | | 4/1991 | Unsworth et al. |
| 6,870,333 B2 * | | 3/2005 | Griepentrog et al. ......... 318/257 |
| 7,592,771 B2 * | | 9/2009 | Fritsch et al. ................. 318/778 |

FOREIGN PATENT DOCUMENTS

| | | |
|---|---|---|
| JP | 2009303323 A | 12/2009 |
| WO | 2007123458 A1 | 11/2007 |
| WO | 2008033088 A1 | 3/2008 |
| WO | 2008046885 A2 | 4/2008 |

OTHER PUBLICATIONS

International Preliminary Report on Patentability; Application No. PCT/EP2009/066026; Issued: May 25, 2012; 18 pages.
International Search Report and Written Opinion of the International Searching Authority; Application No. PCT/EP2009/066026; Issued: Sep. 7, 2010; Mailing Date: Sep. 24, 2010; 11 pages.
Written Opinion of the International Preliminary Examining Authority; Application No. PCT/EP2009/066026; Mailing Date: Mar. 3, 2012; 6 pages.

* cited by examiner

*Primary Examiner* — Walter Benson
*Assistant Examiner* — David Luo
(74) *Attorney, Agent, or Firm* — St. Onge Steward Johnston & Reens LLC

(57) ABSTRACT

A softstarter for starting and stopping an asynchronous motor having three phases, including two pairs of semiconductor devices of the type turning off at zero-crossing of the current therethrough, wherein each of the two pairs of semiconductor devices is connected in anti-parallel, and the first pair of the semiconductor devices is adapted to control the voltage of one of the phases of the motor and the second pair of the semiconductor devices being adapted to control the voltage of another of the phases of the motor, a DC reducing unit associated with the two pairs of semiconductor devices, a first voltage measuring unit for measuring voltages across the two pairs of semiconductor devices, and a first zero-crossing detecting unit configured for detecting zero-crossings of the measured voltages across the two pairs of semiconductor devices and providing zero-crossing signals to the DC reducing unit.

9 Claims, 6 Drawing Sheets

SOFTSTARTER FOR CONTROLLING AN ASYNCHRONOUS THREE-PHASE MOTOR

CROSS-REFERENCE TO RELATED APPLICATIONS

The present application is a continuation of pending International patent application PCT/EP2009/066026 filed on Nov. 30, 2009 which designates the United States and the content of which is incorporated herein by reference.

FIELD OF THE INVENTION

The present invention relates to a softstarter for controlling start and stop operation of an asynchronous motor having three phases. The softstarter controls two of the three phases of the motor.

BACKGROUND OF THE INVENTION

A softstarter for an asynchronous three-phase motor, comprising semiconductor devices for controlling voltages applied to the motor in one, two or three of the phases by adjusting firing angles of semiconductor devices of the type turning-off at zero-crossing of the current therethrough, wherein two semiconductor devices connected in anti-parallel with each other in each phase, has been used for some time. By controlling the voltage in the respective phase a reduction of the torque and current provided to the motor is achieved during start and stop operation. The firing angle of the semiconductor devices is used for controlling the amount of energy supplied to the motor.

Each of these types of softstarters is normally provided with three such pairs of semiconductor devices, such as thyristors. However, the semiconductor devices have become a cost-determining factor of such a softstarter, so a softstarter having only two pairs of such semiconductor devices for three of the phases is used for controlling the voltage applied to three-phase motors. This means that the remaining third phase is in the form of a conductor, which cannot be switched. The present invention is related to this type of softstarters.

It is desired that a softstarter with the above-mentioned type is able to start and stop motors in a desired torque ramp in order to minimize electrical surges in the electrical supply and/or overheating in the motors and to reduce mechanical shocks or vibration which might otherwise occur under start/stop conditions causing wear and damage to the pumps, fans etc. driven by the motors. Such damage may result in higher maintenance costs and also a shortening of the lifetime on the pipe-system.

However, when the control is limited to only two phases, undesired effects in the form of, for example, a DC component in the motor current appear during starting and stopping operation. During start-up or shut-down operation a smooth and gradually increasing or decreasing torque is desired, but this DC component appearing during start-up or shut-down sometimes generates a braking or oscillating torque. This can be both disturbing and damaging to the controller system, the electric motor, and to the motor driven load.

Furthermore, it is costly to carry out measurements on the third phase that is in the form of a conductor since an extra measuring unit and connection point have to be built only for the purpose of the measurement.

A patent application, with a publication number WO 2008/033088, describes a method and a softstarter for reducing such a DC component during start and stop of a motor having three phases, only two of the three phases being controlled by two pairs of semiconductor devices, wherein firing angles of the semiconductor devices are adjusted at a zero-crossing of the current that flows through the semiconductor devices. However, this invention may still have some error in the timing when triggering the semiconductor devices, so that DC components can not be reduced efficiently.

A patent application, with a publication number WO 2008/046885, describes a control method and motor starter device, wherein a motor has three phases and each of the three phases is controlled by a pair of semiconductor devices and the motor torque is controlled in dependence on a torque error signal, based on the calculated difference between the motor torque and a reference torque value, so that the motor torque displays a rate of change with respect to time, during a stopping or starting time interval. However, this invention is related to a softstarter comprising three pairs of semiconductor devices, each pair controlling each of the three phases of the motor.

SUMMARY OF THE INVENTION

The object of the present invention is to provide a softstarter for smoothly starting and stopping an asynchronous motor having three phases, wherein only two phases are controlled by two pairs of semiconductor devices.

This object is achieved by a softstarter, characterized in that the softstarter further comprises a second voltage measuring unit for measuring input voltages in a first and second of the phases or between the first and second phases, a second zero-crossing detecting unit configured to detect zero-crossings of input voltages between the first and second phases and providing zero-crossing signals to the DC-reducing unit, and the DC-reducing unit is configured to calculate phase delays between the zero-crossings of the measured/calculated input voltages between the first and second phases and the zero-crossings of the voltages across the two pairs of semiconductor devices, to calculate an average phase delay based on the two latest phase delays or a multiple of two of the latest phase delays, and to adjust firing angles of the semiconductor devices based on the zero-crossings of the measured/calculated input voltages between the first and second phases and the calculated average phase delay during start and stop of the motor.

A phase-phase, i.e. input voltage between the first and second phase lines, is used as a reference for timing the triggering of the two pairs of semiconductor devices. The input voltage between the first and second phase lines may be measured directly or calculated based on the measured voltages in the first and second phases. The second zero-crossing detecting unit is arranged to detect zero-crossings of the input voltages between the first and second phases and the first zero-crossing detecting unit is arranged to detect zero-crossings of the voltages across the two pairs of semiconductor devices. The detected zero-crossings are provided as digital signals to the DC-reducing unit. The signals are used as references for firing the semiconductor devices and to calculate a phase delay, for either a positive or a negative half period, from a zero-crossing of the input voltage between the first and second phases to a zero-crossing of the voltage across the two pairs of semiconductor devices is calculated.

To adjust a triggering time of a semiconductor device, a more stable zero-crossings of the input voltages between the first and second phases is used as a reference point for firing the semiconductor device. Because the phase delay is calculated for a half period that is either a positive or a negative half period, the average of the two latest phase delays or a multiple of two of the latest phase delays is calculated to even out a time difference between a positive half period and a negative half period, which cancels out the timing error, i.e. the time difference between the phase delays in a positive and negative half periods, during the firings of the semiconductors. Consequently, DC components that would appear during start and stop operation can be reduced more efficiently, as compared to the method described in prior art with a publication number WO 2008/033088, wherein the zero-crossings of voltages across the semiconductor devices, i.e. the zero-crossings of actual currents, are used as reference point.

Due to the fact that the invention is able to adjust the triggering time of the semiconductor devices, and the firing angles of the semiconductor devices are equivalently adjusted, the invention results in an efficient and reliable reduction of DC components during start and stop of the motor, which makes it possible to smoothly start and stop an asynchronous three-phase motor in a desired start and stop ramp, respectively.

According to an embodiment of the invention, the softstarter is also adapted for smoothly starting and stopping said motor and comprises a current measuring unit for measuring currents in at least two of the phases, a voltage estimating unit configured to estimate a input voltage between a third phase and one of the other phases based on the measured voltages measured by the second voltage measuring unit, a power computing unit configured to calculate an instantaneous power supplied to the motor based on at least one estimated input voltage and the measured currents, and a torque control unit including a torque computing unit configured to calculate an electromagnetic torque of said motor based on the calculated instantaneous power, and the torque control unit being adapted to control the motor torque during start and stop of the motor based on the calculated electromagnetic torque and a reference torque value for the electromagnetic torque.

To be able to calculate an electromagnetic torque of the motor, an instantaneous power supplied to the motor needs to be calculated first. Due to the fact that the invention makes it possible to estimate the input voltage between the third phase and one of the first or the second phase, the instantaneous power supplied to the motor can be calculated based on the estimated input voltages and measured/estimated currents.

It is an economic advantage to perform measurements of currents and voltages in as few phases as possible. This, however, requires estimating currents and voltages for those phases that are unmeasured in order to calculate the instantaneous power to be supplied to the motor and thereon further calculate the electromagnetic torque of the motor.

Depending on the type of the second voltage measuring unit, the measured voltages may be either an input voltage between the first and second phases, or the voltages measured in the first and second phases. In a latter case, an input voltage between the first and second phases is calculated based on the measured voltages which may be phase-ground voltages. The input voltage between the third phase and one of the first and second phases is estimated based on the measured or calculated input voltage to enable the power computing unit to calculate the instantaneous power. Preferably, the measurement of input voltages is arranged in the phase line that is controlled by a pair of semiconductor devices, where a measuring device is usually already arranged for the purpose of controlling of the semiconductor devices. This means that a single set of measurement instruments may be used for several purposes, which is an economic advantage.

The advantage to use input voltages between the phases is to make the estimation and calculation more precisely. Impedance separated ground levels for main circuit and control circuit, for example, may disturb a phase-ground measurement, while an input voltage between the phases may minimize such a disturbance. The estimation of an input voltage between the third phase and one of the other phases is based on present and historically measured voltages received from the second voltage measuring unit.

According to an embodiment of the invention, the current measuring unit is configured to measure currents in the first and second phases and the power computing unit is configured to calculate the instantaneous power based on the measured currents of the first and second phases and estimated input voltages between the first and third phases and between the second and third phases. This may be done by a well-known method, for example, a two-watt meter method.

According to another embodiment of the invention, the softstarter further comprises a current estimating unit configured to estimate a current of one of the phases based on the measured currents of the other two phases and the power computing unit is configured to calculate the instantaneous power based on one of the measured currents, one estimated current and the measured input voltages between the first and second phases.

According to an embodiment of the invention, the power computing unit is configured to carry out the calculation of the power with a first frequency and the torque computing unit is configured to carry out the calculation of the electromagnetic torque of said motor with a second frequency which is significantly less than the first frequency. The measured/calculated input voltages are sampled and saved in order to estimate an input voltage between the unmeasured third phase and one of the two phases. It is advantageous that the first frequency is greater than 250 Hz. Such an over-sampling makes the estimation more precise. The second frequency is less than 250 Hz to save computational power, preferably less than 100 Hz.

The object of the invention is also achieved by a method. Such a method comprises the steps of measuring voltages across the two pairs of semiconductor devices, detecting zero-crossings of the measured voltages across the two pairs of semiconductor devices and sending the detected zero-crossings as signals, measuring input voltages in a first and second of the phases or between the first and second phases, detecting zero-crossings of the measured input voltages between the first and second phases and sending the detected zero-crossings as signals, calculating phase delays between the zero-crossings of the measured/calculated input voltages between the first and second phases and the zero-crossings of the voltages across the two pairs of semiconductor devices upon receiving the signals, calculating an average phase delay based on the two latest phase delays or a multiple of two of the latest phase delays, and adjusting firing angles of the semiconductor devices based on the zero-crossings of the measured or calculated input voltages between the first and second phases and the calculated average phase delay during start and stop of the motor.

In order to smoothly start and stop the motor, the method may further comprise the steps of measuring currents in at least two of the phases, estimating an input voltage between a third phase and one of the other phases based on at least one of the measured/calculated input voltages, calculating an instantaneous power supplied to the motor based on at least one estimated input voltage and the measured currents, calculating an electromagnetic torque of said motor based on the calculated instantaneous power, and thereon controlling the motor torque during start and stop of the motor based on the calculated electromagnetic torque and a reference torque value for the electromagnetic torque. The estimation of the input voltage between the third and one of the other phases may be based on an input voltage between the first and second phases, which may be measured directly or be calculated based on the input voltage, i.e. a phase-ground voltage, in the first and second phases.

BRIEF DESCRIPTION OF THE DRAWINGS

The invention will now be explained more closely by the description of different embodiments of the invention and with reference to the appended figures.

FIG. 3 illustrates a graph of the input voltage between two of the three phases, the voltage across the semiconductor devices of one phase and the current to the motor in this phase versus the point in time when the semiconductor devices is turned on or off for the system shown in FIG. 1a.

DETAILED DESCRIPTION OF THE INVENTION

The AC supply frequency to the motor may be either 50 Hz or 60 Hz and the range of operating currents and operating voltages supplied to the motor is extensive. In a system comprising a motor arranged with a softstarter device the angular speed of the motor is generally determined by the supplied frequency and the number of motor poles. It is to be understood that also other frequencies can be used.

Figure 1A:
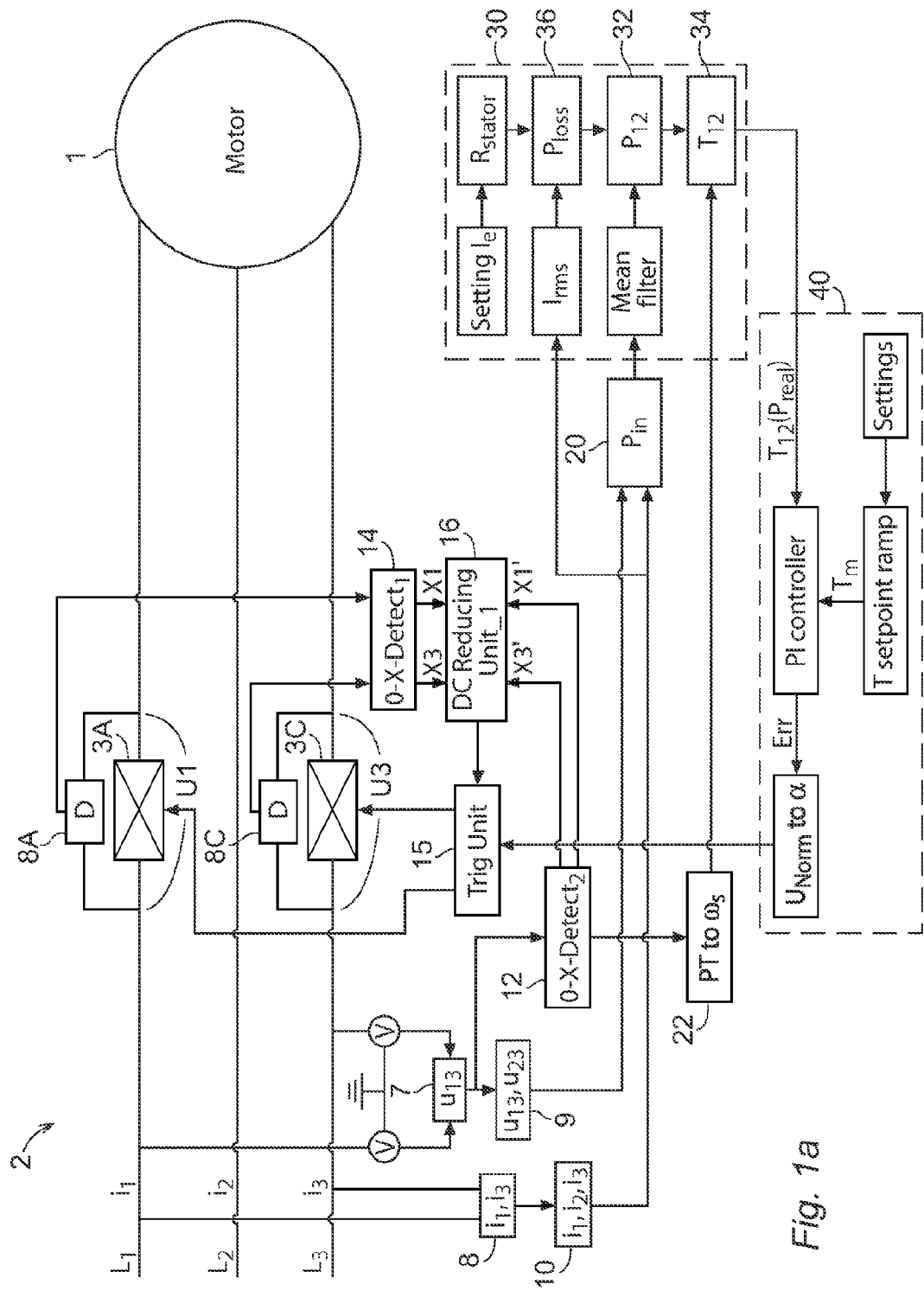
FIG. 1A shows schematically an overview of a system comprising a softstarter according to an embodiment of the invention, wherein a DC reducing unit is adapted to adjust firing angles of the semiconductor devices based on calculated phase delays during start and stop of the motor.

FIG. 1a shows a system comprising an electric motor 1 having three phases, a softstarter device 2 for controlling the current flow and voltage supplied to the motor by controlling two of the three phase lines of the motor and an apparatus such as a pump, not shown in the figure, driven by the motor 1. The motor 1 is, in this case, an alternating current (AC) three-phase electric motor, such as an induction motor. The softstarter device 2 is connected in series to the motor 1. The current supplied to the softstarter device 2 is therefore equal to the current supplied to the motor. In this example, a first phase line $L_1$ and third phase line $L_3$ are controlled while the second phase line $L_2$ is in the form of a conductor that cannot be switched. For each of controlled phase lines $L_1$ and $L_3$, a switch 3A, 3C is provided and connected in series with the line. Each of switches 3A and 3C comprises a pair of semiconductor devices of the type turning-off at zero-cross of the current therethrough and connected in anti-parallel, i.e. back-to-back in parallel, to each other. Such semiconductors may be, for example, thyristors.

Figure 4:
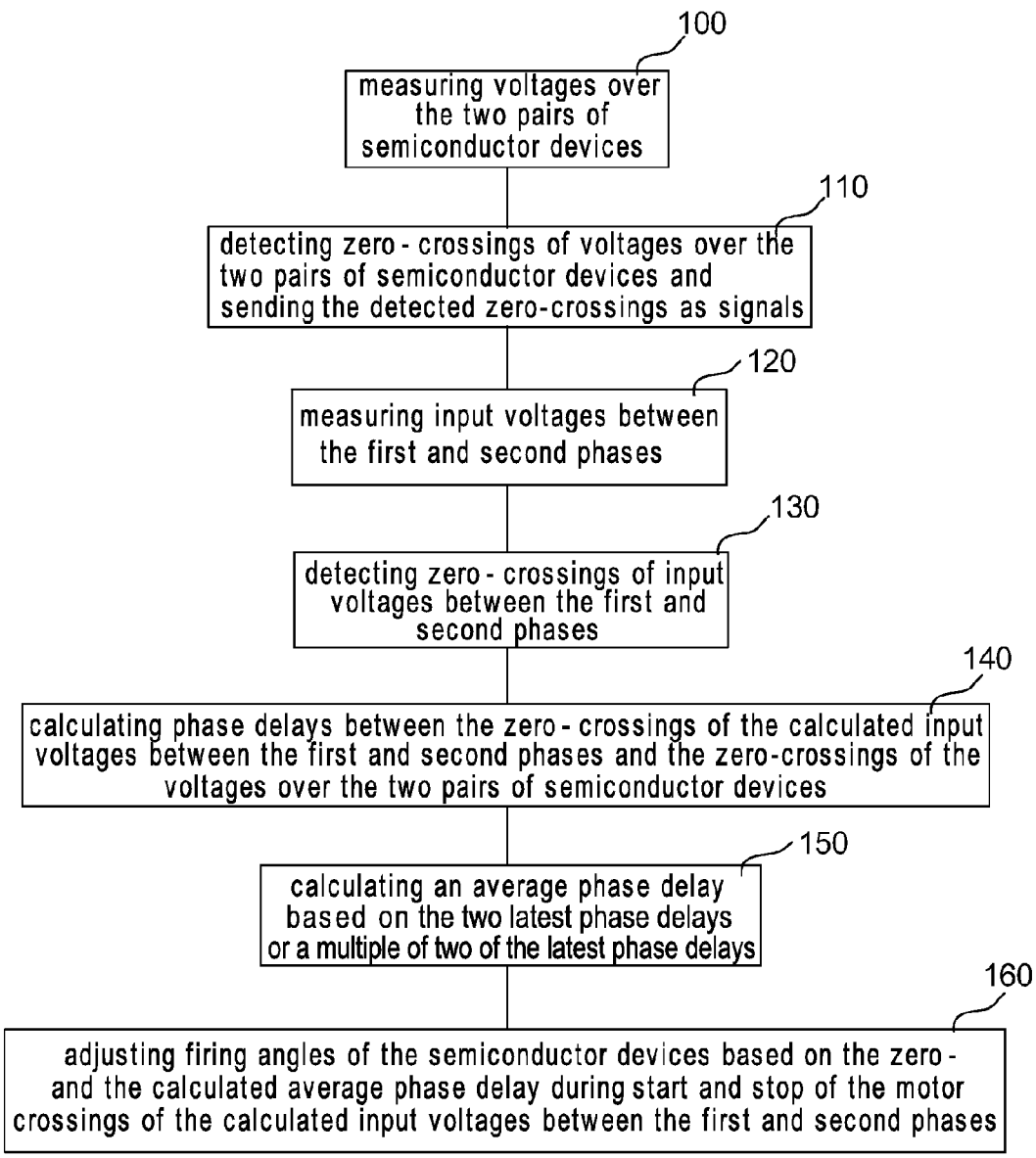
FIG. 4 is a flow chart illustration of the invented method for reducing DC component during starting and stopping operation of a motor having three phases, two of the three phases being controlled by a softstarter, according to an embodiment of the invention.

The softstarter device 2 is adapted to reduce a DC component in a load current for both start and stop of the motor by adjusting firing angles of the semiconductor devices based on the calculated phase delays during start and stop of the motor. It comprises a DC reducing unit 16, a first voltage measuring unit comprising voltage measuring devices 8A and 8C for providing measured voltages across the two switches 3A and 3C, step 100 in FIG. 4, a first zero-crossing detecting unit 14, 0-X-Detect$_1$, configured for detecting the zero-crossing of the measured voltages across the two pairs of semiconductor devices and providing zero-crossing signals to the DC reducing unit, step 110 in FIG. 4, a second voltage measuring unit 7 for measuring input voltages in the first and third phases or between the first and second phases, step 120, a second zero-crossing detecting unit 12, 0-X-Detect$_2$, for detecting the zero-crossing of the input voltage between the first $L_1$ and third $L_3$ phases, step 130 and a trigger unit 15 for sending firing signals to the thyristors of each of the switches.

Each of the voltage measuring devices 8A and 8C is connected in parallel with each pair 3A, 3C of thyristors and provides at its output a digital signal X1 and X3 respectively, representing the measured voltage U1 and U3. When the voltage in question, such as U1, across the thyristors of the switch 3A is essentially zero, i.e., either when at least one of the thyristors is conducting or during a zero-crossing of the phase voltage, then the signal X1 is a logical "0". In all other cases, i.e., when there is a voltage across the switch, the signal X1 is a logical "1". The signal X1 and X3 are forward to the DC reducing unit. Accordingly, digital signals X1' and X3' generated by the second zero-crossing detecting unit 12 are also forwarded to the DC reducing unit, which will be used as reference points for firing each of the thyristors in each of the switches 3A and 3C.

During start and stop of the motor, the DC reducing unit is active and configured to calculate phase delays based on the received signals X1 and X1', X3 and X3', respectively, to control the voltages of two of the three phases, step 140, by adjusting firing angles of the thyristors of each of the switches 3A and 3C, i.e. to make them conductive. In this example, the voltages in the phase lines $L_1$ and $L_3$ are controlled by each 3A, 3C of the thyristor pairs, respectively.

Because zero-crossings of the voltages across the thyristors and zero-crossings of actual currents are simultaneous, a time delay from 0-X-Detect$_2$ to 0-X-Detect$_1$ equals a phase delay between the zero-crossing of the input voltage between two phases and the zero-crossing of a voltage across the corresponding pair of semiconductor devices. Therefore, the triggering time of the thyristors is calculated based on the detected zero-crossings of the input voltages between two of the three phase lines, in this example the first and third phase lines, step 160, compensated with an average phase delay between the zero-crossing of the input voltage and the zero-crossing of the voltage across the semiconductor devices, step 140 in FIG. 4, as follows, $$t_{trig}=t_{uref}+\text{phase\_delay}+\alpha=t_{uref}+(t_{iref}-t_{uref})+\alpha=t_{iref}+\alpha$$

Wherein, $t_{trig}$ is the triggering time of a thyristor, $t_{uref}$ is the time point when the zero-crossing of an input voltage occurs, $\alpha$ is a firing angle generated by a high level algorithm, for example, a ramp generator or a torque control unit as it is in this example, and the phase delay is an average of time differences/delays between the zero-crossing of the input voltage between two phases and the zero-crossings of the voltages across the two pairs of semiconductor devices, which equals the time occurrence of a zero-crossing of an actual current subtracts the time occurrence of a zero-crossing of input voltage, i.e. $t_{iref}-t_{uref}$. To even out the time differences between a positive half period and a negative half period, the average phase delay is calculated by the two latest phase delays, or alternatively, a multiple of 2 of the latest phase delays, for example the latest four or six phase delays, step 150 in FIG. 4. Each of the latest phase delays may be kept in storage when they are calculated.

To calculate the triggering time of a thyristor, the zero-crossing of an input voltages between two of three phases instead of the zero-crossings of an actual currents, which is equivalent to a zero-crossing of the voltage across a thyristor pair, is used as a reference point in time. This reference point is then compensated by the average of the two latest phase delays or a multiple of two of the latest phase delays and the pre-generated firing angle so that the firing angle is adjusted. Therefore, the invention has a significant effect in reducing timing errors caused by using $t_{iref}$ as a reference point in a positive and negative half period, In this way, according to the invention, the timing errors can be cancelled out almost completely, in contrast to the method described in the prior art with a Publication No. WO 2008/033088 would still remain some of timing errors by using a zero-crossing of the current is used as a reference point. This is because the timing of the zero-crossing of an input voltage is more stable than the timing of the zero-crossing of an actual current through the thyristors. Since the latter depends on a number of factors, for example, input voltages between two of the three phases, power factor/phase delay of a motor, harmonics, and most important the way of how firing of thyristors is proceeded. All of these factors affect the timing of the zero-crossing of the actual current. The invention therefore makes it possible to decrease torque variations and oscillations, which, in turn, makes the torque control perform better because less "noises" are input into the torque control loop.

Figure 3:
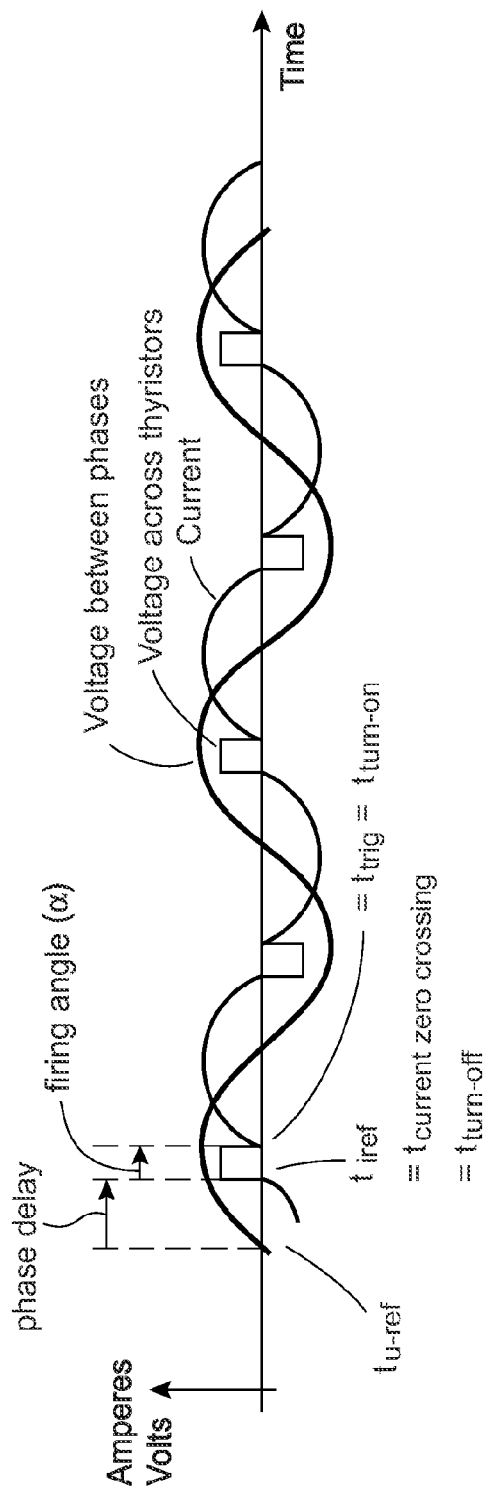

FIG. 3 illustrates a graph of the input voltage between two of the three phases, the voltage across the semiconductor devices of one phase and the current to the motor in this phase versus the point in time when the semiconductor devices are turned on or off for the system shown in FIG. 1a.

By gradually increasing or decreasing the firing angle α, the voltage across the motor terminals is correspondingly adjusted.

The softstarter device 2 is adapted to smoothly start and stop the motor in a desired start and stop ramp by calculating an electromagnetic torque of the motor. It comprises a current measuring unit 8 for measuring input currents to the motor in two of the three phases, in this example, the first and third phases; a current estimating unit 10 for estimating a current of one of the phases, in this example, the current of the second phase; a voltage estimating unit 9 for estimating an input voltage between the third and one of other two phases, in this example, between the second and third phases based on the measured input voltages; a power computing unit 20 and a torque control unit 30 for controlling the switches 3A and 3C and thereby the current by means of regulating the voltage supplied to the motor. Both current and voltage measuring units may be sensors.

Figure 1B:
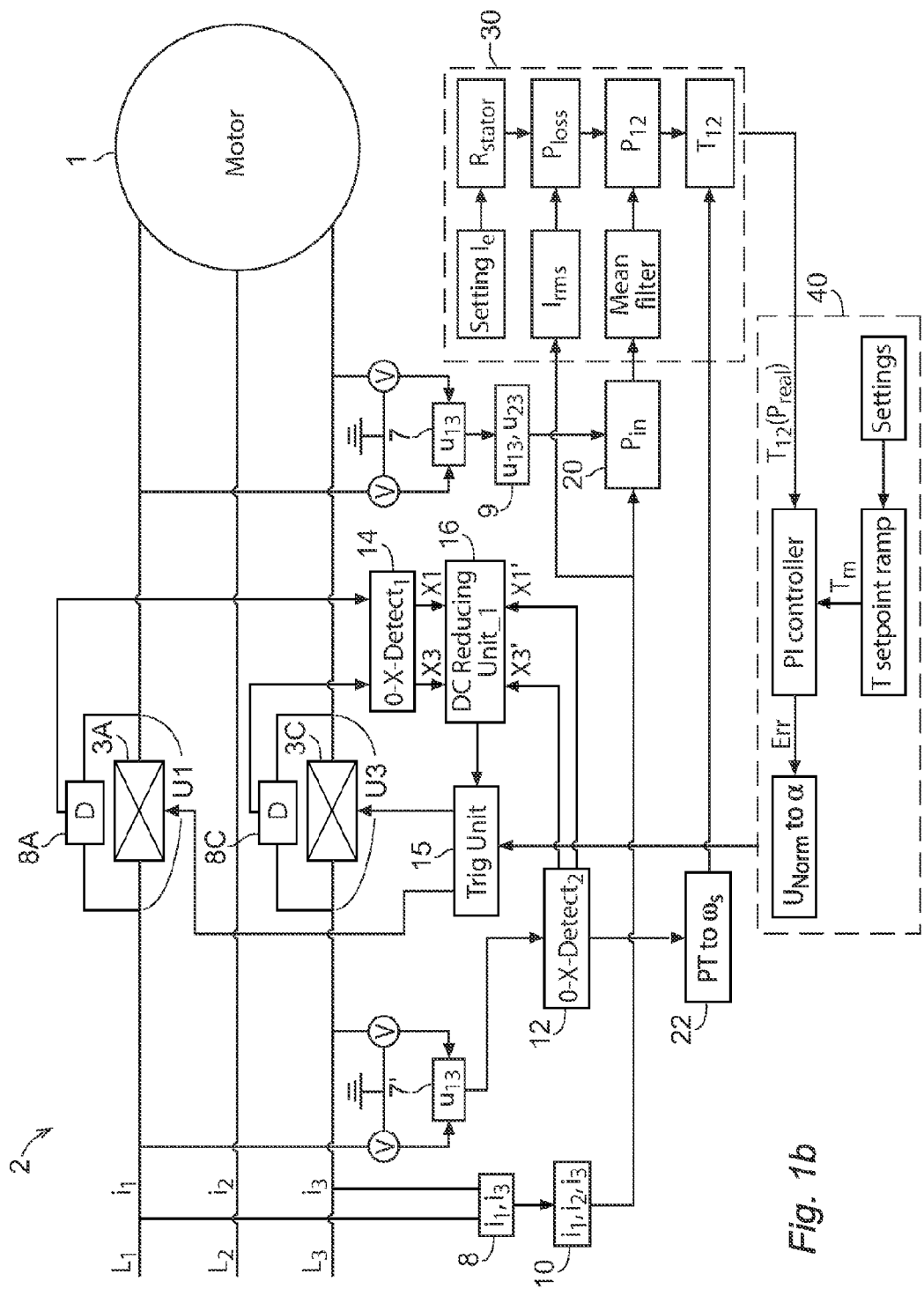
FIG. 1B shows schematically a second embodiment that is a variant of the system illustrated in FIG. 1a, wherein a second voltage measuring unit is arranged after the semiconductor devices.

The current measuring unit 8 provides the measured input currents to the current estimating unit 10 so as the current of the second phase is estimated. The estimated current is input to the power computing unit. In this example, the second voltage measuring unit 7 is arranged to measure phase-ground voltages of the first and third phases and to calculate an input voltage $u_{13}$ between the first and third phases. It may, however, be configured to measure an input voltage between the first and third phases directly. It is also possible to measure the voltages after the switches, i.e. to arrange the second voltage measuring unit 7 between the switches and the motor as illustrated in FIG. 1b for another embodiment.

The voltage estimating unit 9 is configured to receive the measured or calculated input voltage between two phases, in this example, the first and third phases and thereby to estimate another input voltage $u_{23}$ between the second and third phases. The power computing unit 20 is configured, upon receiving the measured current and voltage, the estimated current and voltage, to calculate an instantaneous power $P_{in}$ supplied to the motor based in dependence on the measured current and the calculated and estimated input voltages.

For the system illustrated in FIG. 1a, the calculation of the instantaneous power $P_{in}$ can be done as follows, $$p = i_1 * u_{13} + i_2 * u_{23}$$

wherein
p is an instantaneous power to be calculated;
$i_2 = -i_1 - i_3$, $i_1$ and $i_3$ are currents instantaneously measured and sampled; $u_{13}$ is an input voltage between the first and third phases, which may be instantaneously measured directly or calculated by instantaneous measured voltages in first and second phases; $u_{23}$ is an estimated input voltage between the second and third phases. With an instantaneous measured/calculated input voltage, can be estimated as, $$u_{23}(k) = u_{13}(k-x)$$

wherein,
$u_{23}(k)$ is an estimated instantaneous input voltage between the second and third phases for the present time/latest sample;
$u_{13}(k-x)$ is an instantaneous voltage between the first and third phases measured/sampled 120° ago, x=(120/360)* $(T/T_S)$ rounded to the closest integer, T is the period time for the input voltage and $T_S$ is the interval between samples.

As it may be observed, this calculation of the instantaneous power needs to estimate one current and one input voltage between the second and third phases. However, other forms of calculations may be applied as well; for example, use two measured currents and two estimated input voltages.

The torque control unit 30 includes a torque computing unit 34 configured to calculate an electromagnetic torque of the motor in dependence on the calculated instantaneous power. In this example, the torque control unit further includes a torque feedback regulator loop 40 adapted to control the torque by means of regulating the voltage supplied to the motor. The feedback regulator loop may be a proportional-integrating feedback loop, also called PI-regulator. With this parameter, the torque control unit 30 calculates the power losses $P_{loss}$ in the motor based on the relationship between nominal current $I_{rms}$ and stator resistance $R_{stator}$.

The motor power losses are subtracted from the calculated supplied instantaneous power $P_{in}$ and a real power $P_{real}$ to the motor 1 is calculated. The electromagnetic torque $T_{12}$ of the motor 1 is then determined by using the real power $P_{real}$. The torque $T_{12}$ of the motor is, in this case, proportional to the real power $P_{real}$ supplied to the motor. The torque feedback regulator loop 18 is used to provide better control over the deceleration and acceleration of the motor. In the regulation loop, a difference between the estimated electromagnetic torque $T_{12}$ and a reference value $T_m$ for the electromagnetic torque is calculated. An error signal is calculated dependent on the comparison between the calculated torque and the reference value. The speed of the motor is controlled in dependence on the torque error signal. The reference torque $T_m$ value is obtained from a torque T set-point ramp determined from a load model based on experience, e.g. for quadratic loads such as pumps. The T set-point ramp is based on input settings related to start and stop time and a rated current $I_e$, and voltage measured by the second voltage measuring unit 7.

When starting a motor, the softstarter device 2 has a target torque which may be equal to be at least the nominal input current multiplied by the voltage as measured. This has the effect of a torque target that is probably in excess of the torque that the motor 1 plus load attains. The rate of increase of torque is substantially linear and preferably an even, steady increase in torque. The use of a torque target and torque control makes the acceleration smoother and more even. This principle can be applied to a stop operation of the motor with a steady decrease of torque. Therefore the object of smoothly starting and stopping a three-phase motor is achieved.

Figure 2A:
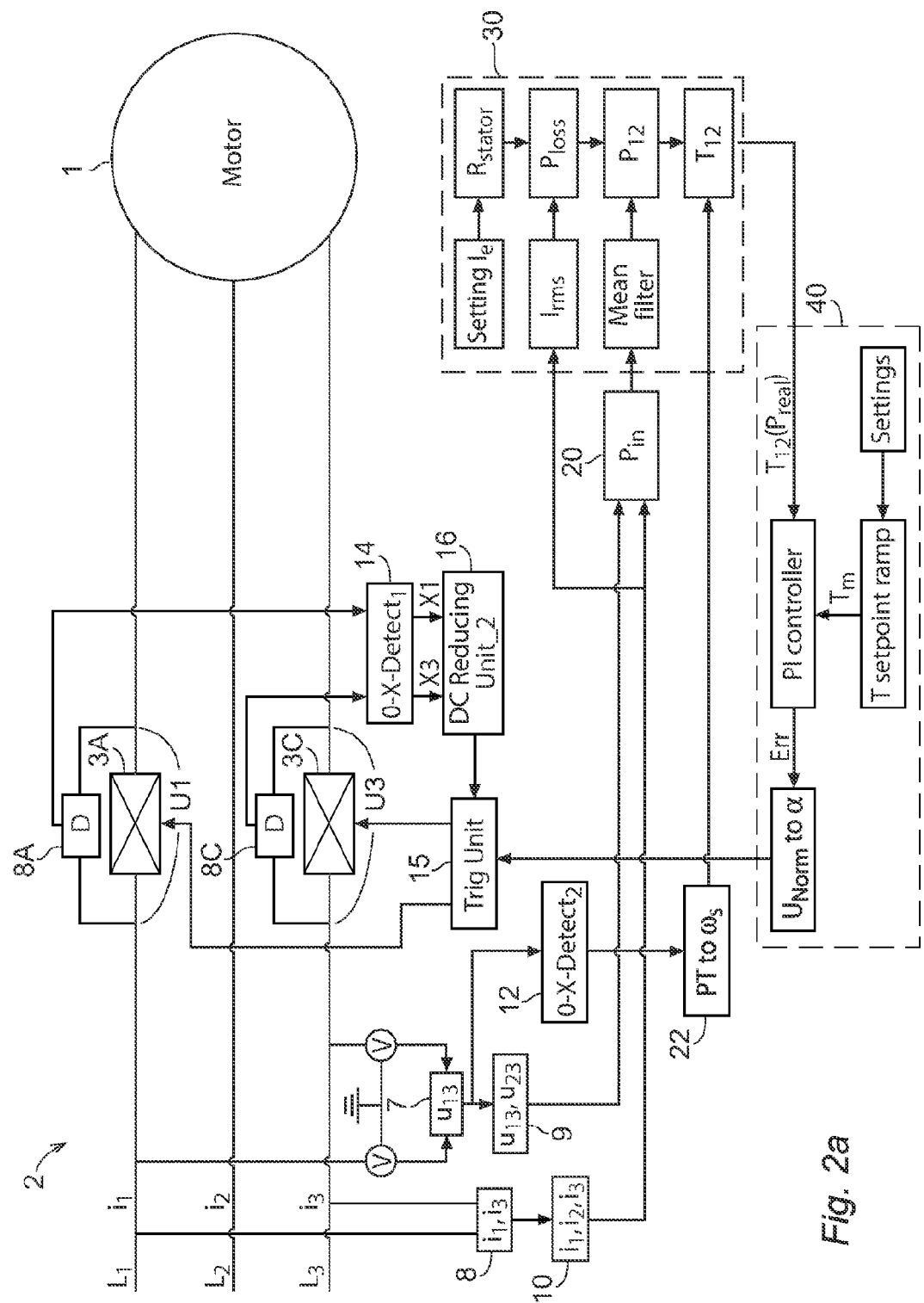
FIG. 2A shows schematically a third embodiment that is another variant of the system illustrated in FIG. 1a, wherein a DC reducing unit is adapted to adjust firing angles of the semiconductor devices by using zero-crossings of input currents as references for calculating firing angles during start and stop of the motor.
Figure 2B:
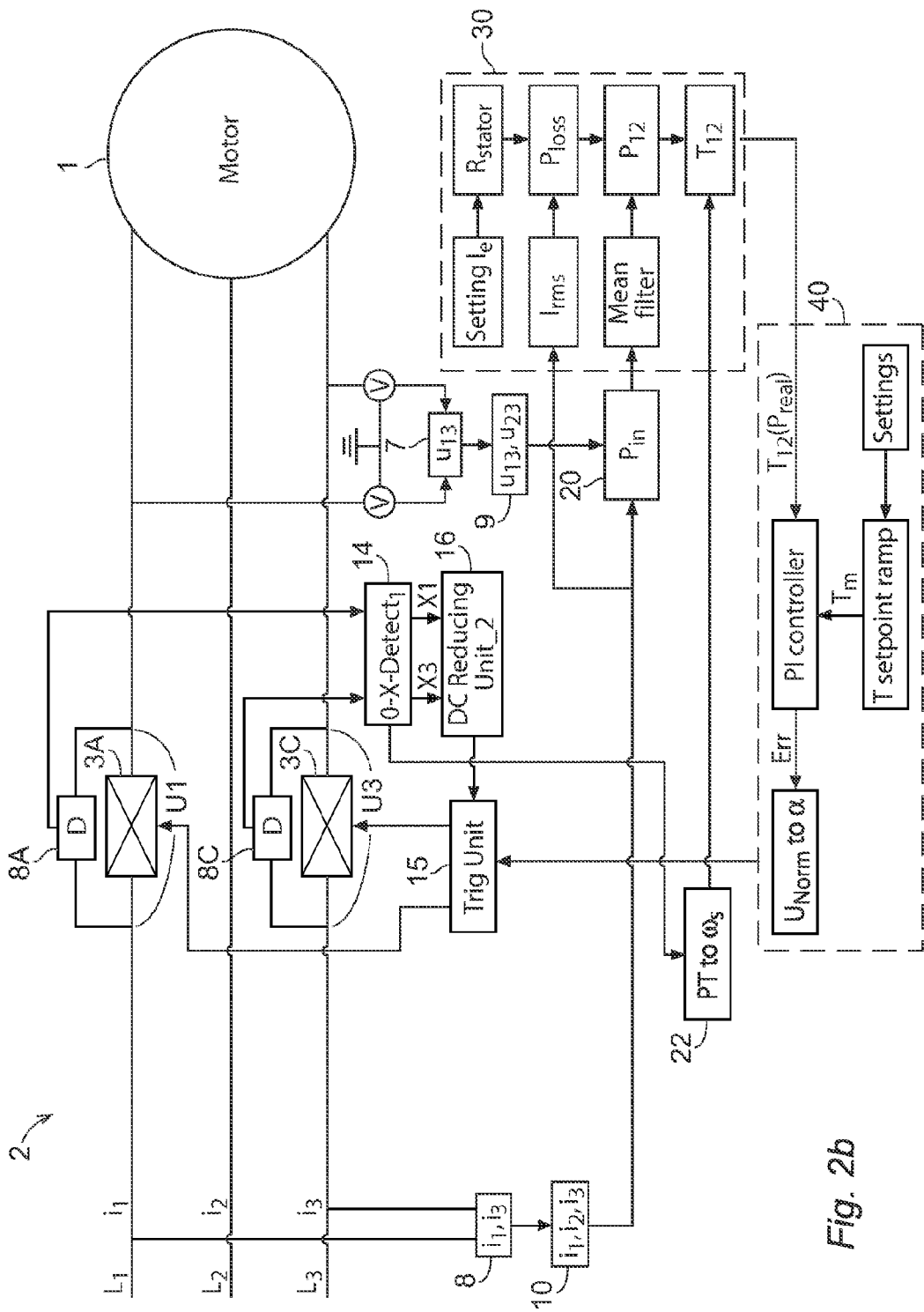
FIG. 2B shows schematically a fourth embodiment that is a variant of the system illustrated in FIG. 2a, wherein a second voltage measuring unit is arranged after the semiconductor devices.

It is also possible to combine the torque control unit with another DC-reducing unit to achieve the object of the invention as shown in FIG. 2a, wherein, a DC-reducing component, using zero-crossings of input currents as references for calculating firing angles as described in the prior art, is adapted to adjust firing angles of the semiconductor devices during start and stop of the motor. FIG. 2b is a variant of the system illustrated in FIG. 2a, wherein the voltage measuring unit for measuring voltages in a first and second of the phases or between the first and second phases is arranged between the switches and the motor.

It should be noted that, although, the above describes exemplifying embodiments of the invention, there are several variations which may be made to the described solution without departing from the scope of the present invention as defined in the claims. For example, measuring only the currents controlled by the softstarter may be a variant.

What is claimed is:

1. A softstarter for starting and stopping an asynchronous motor having three phases, wherein only two of the three phases are controlled by the softstarter, the softstarter comprising
    two pairs of semiconductor devices of the type turning off at zero-crossing of the current therethrough, wherein each of said two pairs of semiconductor devices is connected in anti-parallel, and the first pair of the semiconductor devices is adapted to control the voltage of one of the phases of the motor and the second pair of the semiconductor devices being adapted to control the voltage of another of the phases of the motor,
    a DC reducing unit associated with said two pairs of semiconductor devices for reducing a DC component in a load current of the said asynchronous three-phase motor during start of the motor,
    a first voltage measuring unit for measuring voltages across the two pairs of semiconductor devices, and
    a first zero-crossing detecting unit configured for detecting zero-crossings of the measured voltages across the two pairs of semiconductor devices and providing zero-crossing signals to the DC reducing unit, and
characterized in that the softstarter further comprises,
    a second voltage measuring unit for measuring input voltages in a first and second of the phases or between the first and second phases,
    a second zero-crossing detecting unit configured to detect zero-crossings of the input voltages between the first and second phases and providing zero-crossing signals to the DC reducing unit,
    the DC-reducing unit is configured to calculate phase delays between the zero-crossings of the measured/calculated input voltages between the first and second phases and the zero-crossings of the voltages across the two pairs of semiconductor devices, to calculate an average phase delay based on the two latest phase delays or a multiple of two of the latest phase delays, and to adjust firing angles of the semi conductor devices based on the zero-crossings of the measured/calculated input voltages between the first and second phases and the calculated average phase delay during start and stop of the motor,
    a current measuring unit for measuring currents in at least two of the phases,
    a voltage estimating unit configured to estimate an input voltage between a third phase and one of the other phases based on at least one of the measured input voltages measured by the second voltage measuring unit,
    a power computing unit configured to calculate an instantaneous power supplied to the motor based on at least one estimated input voltage and the measured currents, and
    a torque control unit including a torque computing unit configured to calculate an electromagnetic torque of said motor based on the calculated instantaneous power, and the torque control unit being adapted to control the motor torque during start and stop of the motor based on the calculated electromagnetic torque and a reference torque value for the electromagnetic torque.

2. The softstarter according to claim 1, wherein the second zero-crossing detecting unit is further configured to calculate input voltages between the first and second phases based on the measured voltages in the first and second phases.

3. The softstarter according to claim 1, wherein the current measuring unit is configured to measure currents in the first and second phases and the power computing unit is configured to calculate the instantaneous power based on the measured currents of the first and second phases and estimated input voltages between the first and third phases and between the second and third phases.

4. The softstarter according to claim 1, wherein the softstarter further comprises a current estimating unit configured to estimate a current of one of the phases based on the measured currents of the other two phases and the power computing unit is configured to calculate the instantaneous power based on one of the measured currents, one estimated current and the measured input voltage between the first and second phases.

5. The softstarter according to claim 1, wherein the voltage estimating unit configured to estimate the input voltage between a third phase and one of the other phases based on present and historically measured voltages received from the second voltage measuring unit.

6. The softstarter according to claim 1, wherein the power computing unit is configured to carry out the calculation of the power with a first frequency and the torque computing unit is configured to carry out the calculation of the electromagnetic torque of said motor with a second frequency which is significantly less than the first frequency.

7. The softstarter according to claim 6, wherein the first frequency is higher than 250 Hz and the second frequency is lower than 250 Hz.

8. A method for reducing DC component during starting and stopping an asynchronous motor having three phases, wherein only two of the three phases are controlled by a softstarter comprising two pairs of semiconductor devices of the type turning off at zero-crossing of the current therethrough, each of said two pairs of semiconductor devices being connected in anti-parallel, and the first pair of the semiconductor devices being arranged to control the voltage of one of the phases of the motor and the second pair of the semiconductor devices being adapted to control the voltage of another of the phases of the motor, the method comprising, measuring voltages across the two pairs of semiconductor devices, and detecting zero-crossings of the measured voltages across the two pairs of semiconductor devices and sending the detected zero-crossings as signals, and characterized in that the method further comprises, measuring input voltages in a first and second of the phases or between the first and second phases, detecting zero-crossings of the measured input voltages between the first and second phases and sending the detected zero-crossings as signals, calculating phase delays between the zero-crossings of the measured/calculated input voltages between the first and second phases and the zero-crossings of the voltages across the two pairs of semiconductor devices upon receiving the sent signals, calculating an average phase delay based on the two latest phase delays or a multiple of two of the latest phase delays, and adjusting firing angles of the semiconductor devices based on the zero-crossings of the calculated input voltages between the first and second phases and the calculated average phase delay during start and stop of the motor measuring currents in at least two of the phases, estimating an input voltage between a third phase and one of the other phases based on at least one of the measured input voltages, calculating an instantaneous power supplied to the motor based on at least one estimated input voltage and the measured currents, calculating an electromagnetic torque of said motor based on the calculated instantaneous power, and thereon controlling the motor torque during start and stop of the motor based on the calculated electromagnetic torque and a reference torque value for the electromagnetic torque.

9. The method according to claim 8, wherein the method further comprises a step of calculating input voltages between the first and second phases based on the measured voltages in the first and second phases.

* * * * *